(12) United States Patent
Liu et al.

(10) Patent No.: US 10,733,711 B2
(45) Date of Patent: Aug. 4, 2020

(54) IMAGE CORRECTION METHOD AND DEVICE

(71) Applicant: BOE TECHNOLOGY GROUP CO., LTD., Beijing (CN)

(72) Inventors: Xiangyang Liu, Beijing (CN); Xitong Ma, Beijing (CN); Naifu Wu, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/200,944

(22) Filed: Nov. 27, 2018

(65) Prior Publication Data

US 2019/0251676 A1 Aug. 15, 2019

(30) Foreign Application Priority Data

Feb. 9, 2018 (CN) .......................... 2018 1 0135496

(51) Int. Cl.
| | |
|---|---|
| *G06T 5/00* | (2006.01) |
| *G06T 7/70* | (2017.01) |
| *G06F 3/01* | (2006.01) |
| *G06T 5/50* | (2006.01) |
| *G02B 27/01* | (2006.01) |
| *G06K 9/00* | (2006.01) |

(52) U.S. Cl.
CPC .......... *G06T 5/006* (2013.01); *G02B 27/0101* (2013.01); *G06F 3/013* (2013.01); *G06K 9/00228* (2013.01); *G06T 5/50* (2013.01); *G06T 7/70* (2017.01); *G02B 2027/011* (2013.01); *G02B 2027/014* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2017/0054963 A1* | 2/2017 | Kasazumi | ............. B60K 35/00 |
| 2017/0116703 A1 | 4/2017 | Sundareson et al. | |
| 2019/0096043 A1 | 3/2019 | Ma et al. | |

FOREIGN PATENT DOCUMENTS

| | | |
|---|---|---|
| CN | 103885573 A | 6/2014 |
| CN | 104253990 A | 12/2014 |
| CN | 206260049 U | 6/2017 |
| CN | 107650799 A | 2/2018 |

OTHER PUBLICATIONS

First Chinese Office Action dated Jan. 22, 2020, received for corresponding Chinese Application No. 201810135496.1, 20 pages.

* cited by examiner

*Primary Examiner* — Ke Xiao
*Assistant Examiner* — Jed-Justin Imperial
(74) *Attorney, Agent, or Firm* — Kinney & Lange, P.A.

(57) ABSTRACT

The present disclosure provides an image correction method and device. The method includes: correcting a target face image; obtaining first eye position information and second eye position information through calculation according to the face image; obtaining a first image correction parameter and a second image correction parameter via calculation based on the first eye position information and the second eye position information; and correcting a first image according to the first image correction parameter and correcting a second image according to the second image correction parameter.

12 Claims, 2 Drawing Sheets

IMAGE CORRECTION METHOD AND DEVICE

CROSS-REFERENCE TO RELATED APPLICATION

This application claims the benefit and priority of Chinese Application No. 201810135496.1, filed on Feb. 9, 2018, the entire disclosure of which is incorporated herein by reference.

TECHNICAL FIELD

The present disclosure relates to the field of image correction technologies, and in particular to an image correction method and device.

BACKGROUND

With continuous development of science and technology, some automakers also have added head up display (HUD) devices to cars to attract consumers.

When one driver turns during the driver's driving, the driver's position may be changed to cause changes in a viewing position of the driver, and there are different distortions in vehicle-mounted HUD images due to different positions of the driver, thereby adversely affecting the driver watching the HUD images.

SUMMARY

One embodiment of the present disclosure provides an image correction method that includes: collecting a target face image; obtaining first eye position information and second eye position information through calculation according to the face image; obtaining a first image correction parameter and a second image correction parameter via calculation based on the first eye position information and the second eye position information; and correcting a first image according to the first image correction parameter and correcting a second image according to the second image correction parameter.

Optionally, the obtaining first eye position information and second eye position information through calculation according to the face image includes: detecting the first eye and the second eye from the face image according to an eye detection algorithm; and tracking in real time positions of the first eye and the second eye according to a tracking algorithm, and obtaining the first eye position information and the second eye position information through calculation.

Optionally, the obtaining a first image correction parameter and a second image correction parameter via calculation based on the first eye position information and the second eye position information, includes: setting a threshold quantity of first eye preset positions and a threshold quantity of second eye preset positions; obtaining each initial first image correction parameter at each first eye preset position for the first eye, and obtaining each initial second image correction parameter at each second eye preset position for the second eye; determining a first function relationship between each first eye preset position and each initial first image correction parameter, and determining a second function relationship between each second eye preset position and each initial second image correction parameter; and obtaining the first image correction parameter through calculation based on the first function relationship and the first eye position information, and obtaining the second image correction parameter through calculation based on the second function relationship and the second eye position information.

Optionally, the first function relationship is expressed as: $k_l = f(u_l, v_l)$; and the second function relationship is expressed as: $k_r = f(u_r, v_r)$; wherein $k_l$ is the initial first image correction parameter, $k_r$ is the initial second image correction parameter, $(u_l, v_l)$ is the first eye preset position, and $(u_r, v_r)$ is the second eye preset position.

Optionally, the correcting a first image according to the first image correction parameter and correcting a second image according to the second image correction parameter, includes: correcting the first image and the second image according to the following formula, respectively, $$\begin{cases} x' = \dfrac{x}{1+ky} \cdot (1 + k y_{max}) \\ y' = y \end{cases}$$

where x is a row coordinate of the first image or the second image; y is a column coordinate of the first image or the second image; x' is a row coordinate of a corrected first image or a corrected second image; y' is a column coordinate of the corrected first image or the corrected second image; $y_{max}$ is a height of the first image or the second image; and k is a correction parameter.

Optionally, the first image and the second image are head up display images.

Optionally, the collecting a target face image includes: collecting the target face image once every a first quantity of frames.

One embodiment of the present disclosure further provides an image correction device that includes: a collector configured to collect a target face image; a position information calculation circuit configured to obtain first eye position information and second eye position information through calculation according to the face image; a correction parameter calculation circuit configured to, based on the first eye position information and the second eye position information, obtain a first image correction parameter and a second image correction parameter via calculation; and a correction circuit configured to correct a first image according to the first image correction parameter and correct a second image according to the second image correction parameter.

Optionally, the position information calculation circuit includes: an eye detection sub-circuit configured to detect the first eye and the second eye from the face image according to an eye detection algorithm; and an eye position information calculation sub-circuit configured to track in real time positions of the first eye and the second eye according to a tracking algorithm, and obtain the first eye position information and the second eye position information through calculation.

Optionally, the correction parameter calculation circuit includes: a preset position setting sub-circuit configured to set a threshold quantity of first eye preset positions and a threshold quantity of second eye preset positions; an initial image correction parameter obtaining sub-circuit configured to obtain each initial first image correction parameter at each first eye preset position for the first eye and obtain each initial second image correction parameter at each second eye preset position for the second eye; a function relationship determining sub-circuit configured to determine a first function relationship between each first eye preset position and each initial first image correction parameter and determine a second function relationship between each second eye preset position and each initial second image correction parameter; and an image correction parameter calculation sub-circuit configured to obtain the first image correction parameter through calculation based on the first function relationship and the first eye position information and obtain the second image correction parameter through calculation based on the second function relationship and the second eye position information.

Optionally, the first function relationship is expressed as: $k_l=f(u_l,v_l)$; and the second function relationship is expressed as: $k_r=f(u_r,v_r)$; wherein $k_l$ is the initial first image correction parameter, $k_r$ is the initial second image correction parameter, $(u_l,v_l)$ is the first eye preset position, and $(u_r,v_r)$ is the second eye preset position; and wherein the image correction parameter calculation sub-circuit is further configured to obtain the first image correction parameter through calculation based on the first function relationship $k_l=f(u_l,v_l)$ and the first eye position information and obtain the second image correction parameter through calculation based on the second function relationship $k_r=f(u_r,v_r)$ and the second eye position information.

Optionally, the correction circuit includes a correction sub-circuit configured to use the following formula to correct the first image and the second image, respectively, $$\begin{cases} x' = \dfrac{x}{1+ky} \cdot (1+ky_{max}) \\ y' = y \end{cases};$$

where x is a row coordinate of the first image or the second image; y is a column coordinate of the first image or the second image; x' is a row coordinate of a corrected first image or a corrected second image; y' is a column coordinate of the corrected first image or the corrected second image; $y_{max}$ is a height of the first image or the second image; and k is a correction parameter.

Optionally, the first image and the second image are head up display images.

Optionally, the collector is further configured to collect the target face image once every a first quantity of frames.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Figure 1:
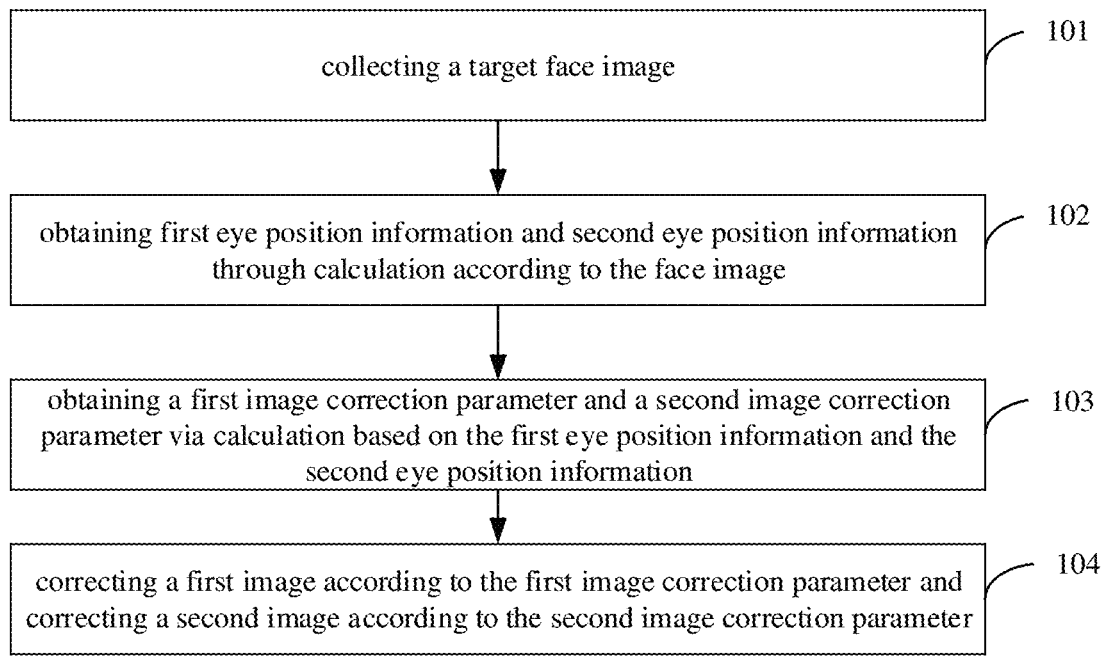
FIG. 1 is a flow chart of an image correction method according to an embodiment of the present disclosure.

FIG. 1 is a flow chart of an image correction method according to an embodiment of the present disclosure. Referring to FIG. 1, the image correction method includes the following steps 101-103.

At the step 101, one target face image is collected.

In one embodiment of the present disclosure, the image correction method is used to correct a distorted 3D image.

When a user watches displayed images, it is needed to collect a face image of the user (i.e., the target face image) and then analyze whether the displayed images are distorted according to characteristics of the face image.

In an optional embodiment of the present disclosure, the above step 101 may include a sub-step N1 of collecting the face image of the user once every preset quantity of frames.

In one embodiment of the present disclosure, the face image of the user may be collected once every preset quantity of frames. For example, the face image of the user may be collected once every frame to analyze whether the displayed images are distorted. In some embodiments, the face image of the user may be collected by means of a camera.

The preset quantity of frames (which is also referred as a first quantity of frames) may be set according to actual situations. For example, the preset quantity of frames may be 1, 3 and so on, which is not limited thereto.

In an optional embodiment of the present disclosure, before the above step 101, the image correction method further includes the following steps S1-S3.

At the step S1, a first initial position information for a first eye and a second initial position information for a second eye are set.

At the step S2, a first preset image correction parameter for a first image is calculated according to the first initial position information, and a second preset image correction parameter for a second image is calculated according to the second initial position information.

At the step S3, the first image is projected according to the first preset image correction parameter, and the second image is projected according to the second preset image correction parameter.

In one embodiment of the present disclosure, when the first eye is the left eye of the user, then the second eye is the right eye of the user. When the first eye is the right eye of the user, then the second eye is the left eye of the user.

By setting the first initial position information for the first eye and the second initial position information for the second eye, the first preset image correction parameter for the first image corresponding to the first eye as well as the second preset image correction parameter for the second image corresponding to the second eye are obtained through calculation. The first preset image correction parameter and the second preset image correction parameter may be preset image correction parameters that are calculated based on experience of developers or based on the experience of developers as well as the initial position information for the first eye and the second eye. Then, the first image is projected according to the first preset image correction parameter, and the second image is projected according to the second preset image correction parameter.

After collecting the face image of the user, the step 102 is performed.

At the step 102, first eye position information and second eye position information of the user are obtained through calculation according to the face image.

After collecting the face image of the user, the current position information of the eyes are analyzed according to the characteristics of the face image and compared with the initial position information for projecting images, thereby determining a variation scale of positions of the eyes, such as an offset distance of the left eye or right eye towards a right/left direction or in a front/rear direction. The image correction parameters may be obtained through calculation according to the variation scale of the first eye and the second eye.

Optionally, the above step 102 may include the following sub-steps S1 and S2.

At the sub-step S1, the first eye and the second eye are detected from the face image according to an eye detection algorithm.

At the sub-step S2, positions of the first eye and the second eye are tracked in real time according to a tracking algorithm, and obtaining the first eye position information and the second eye position information through calculation.

In one embodiment of the present disclosure, detecting the first eye and the second eye from the face image according to the eye detection algorithm includes: a first step of determining a face region in the face image; a second step of determining an eye range in the face region; and a third step of, based on an active shape model, determining initial positions of feature points corresponding to the eyes according to the eye range, and determining positions of the eyes by fitting.

The active shape model is a set of attributes of multiple feature points of the human face obtained from sample training. The multiple feature points at least include points corresponding to the eyes, and the attributes at least include position information, location constraint condition and texture information of the corresponding points.

It should be noted that the above first step to the third step are provided to better understand the technical solution of one embodiment of the present disclosure, and any eye detection algorithm (e.g., Viola-Jones eye detection algorithm) in the related art that can detect the first eye and the second eye from the face image may be applied to embodiments of the present disclosure, which will not be elaborated herein.

After the first eye and the second eye are detected from the face image according to the eye detection algorithm, the positions of the first eye and the second eye are tracked in real time according to the tracking algorithm, and then the first eye position information and the second eye position information are obtained through calculation.

It should be noted that the tracking algorithm is an algorithm commonly used by those skilled in the related art, such as the meanshift tracking algorithm commonly used in relevant technical solution, and so on.

After obtaining the first eye position information and the second eye position information of the user, the step 103 is performed.

At the step 103, based on the first eye position information and the second eye position information, a first image correction parameter and a second image correction parameter are obtained via calculation according to a preset algorithm.

In one embodiment of the present disclosure, after obtaining the first eye position information and the second eye position information of the user, the first image correction parameter corresponding to the first image and the second image correction parameter corresponding to the second image are obtained according to the preset algorithm.

The preset algorithm will be described in the following optional embodiment.

Optionally, the above step 103 may include the following sub-steps N1 to N4.

At the sub-step N1, a threshold quantity of first eye preset positions and a threshold quantity of second eye preset positions are set in advance.

At the sub-step N2, each initial first image correction parameter at each first eye preset position for the first eye are calculated, and each initial second image correction parameter at each second eye preset position for the second eye are calculated.

At the sub-step N3, a first function relationship between each first eye preset position and each initial first image correction parameter is determined, and a second function relationship between each second eye preset position and each initial second image correction parameter is determined.

At the sub-step N4, the first image correction parameter is obtained through calculation based on the first function relationship and the first eye position information, and the second image correction parameter is obtained through calculation based on the second function relationship and the second eye position information.

In one embodiment of the present disclosure, the threshold quantity of first eye preset positions and the threshold quantity of second eye preset positions are set in advance. For example, the threshold quantity may be 100, 180, 200, and so on.

By calculating each initial first image correction parameter at each first eye preset position for the first eye and each initial second image correction parameter at each second eye preset position for the second eye, the first function relationship between each first eye preset position and each initial first image correction parameter can be determined according to each initial first image correction parameter, and the second function relationship between each second eye preset position and each initial second image correction parameter can be determined according to each initial second image correction parameter.

Figure 2:
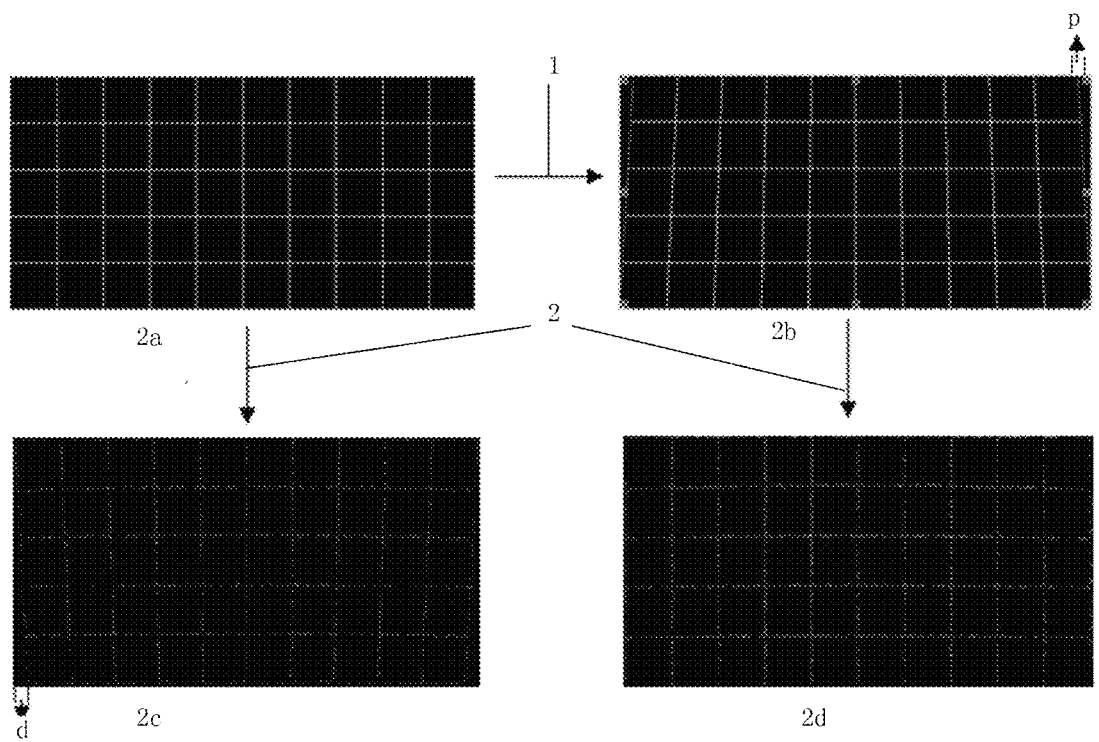
FIG. 2 is a schematic diagram showing correction of a distorted image according to an embodiment of the present disclosure.

As an example, FIG. 2 is a schematic diagram showing correction of a distorted image according to an embodiment of the present disclosure.

When an original image passes through an optical system, trapezoidal distortion may be generated; thus, it is needed to correct the original image. Generally, the distortion correction algorithm is used to correct the original image, thereby eliminating the trapezoidal distortion generated when the original image passes through the optical system. For example, as shown in FIG. 2, d represents a distortion amount which may be obtained by means of using a central processing unit (CPU) to compare an image obtained by using a polarized camera to capture the original image with the original image; p represents a correction amount which is an index used to measure correction degree of the correction algorithm. An arrow 1 shown in FIG. 2 represents that the original image has been corrected, and an arrow 2 shown in FIG. 2 represents that one image passes through the optical system.

As shown in FIG. 2, when one original image is not corrected and passes through the optical system, trapezoidal distortion may be generated with an distortion amount d (as shown in FIG. 2*a* and FIG. 2*c*). When the correction amount p is set to be equal to the distortion amount d, i.e., p=d, the original image may be corrected through the following distortion correction algorithm to eliminate the trapezoidal distortion (as shown in FIG. 2b and FIG. 2d).

The distortion correction algorithm may be realized through the following formula (1):

$$\begin{cases} x' = \dfrac{x}{1+ky} \cdot (1+ky_{max}) \\ y' = y \end{cases} \quad (1)$$

Where, x' is a row coordinate of the original image; y' is a column coordinate of the original image; x is a row coordinate of the corrected original image; y is a column coordinate of the corrected original image; $y_{max}$ represents a height of the original image; k is a correction parameter. As can be seen from the above formula (1), the greater the k, the greater the p.

By setting a preset quantity of first eye positions and a preset quantity of second eye positions in the original image and continuously adjusting values of k until obtaining an image that is not distorted at the current position of the eyes, the value of k at this point is recorded, thereby obtaining a corresponding quantity of correction parameters k corresponding to the preset quantity of the first eye positions and the preset quantity of second eye positions. Then, based on coordinates of the preset quantity of the first eye positions, coordinates of the preset quantity of second eye positions as well as values of k, a function relationship between k and the coordinates of the first eye positions as well as the coordinates of the second eye positions can be determined.

For example, when a size of an original image is 1024*768, 200 different positions in the original image may be randomly set in advance for the first eye, i.e., a first image position, a second image position, . . . , an i-th image position, . . . a 200-th image position. Meanwhile, positions of the second eye in the original image may be obtained through calculation according to a pupil distance of the eyes, and the positions of the second eye in the original image are corresponding to the positions of the first eye in the original image, respectively, i.e., a P1-th image position, a P2-th image position, . . . , an Pi-th image position, . . . a P200-th image position. Then, coordinates of the 200 image positions for the first eye and coordinates of the corresponding 200 image positions for the second eye can be determined. For example, when the first eye is at the i-th image position, coordinates of the corresponding Pi-th image position for the second eye is $u_i$, $v_i$); then the correction parameter k capable of eliminating distortion is determined when the first eye is at each of the first image position, the second image position, . . . , the i-th image position, . . . the 200-th image position while the second eye is at each of the corresponding P1-th image position, the P2-th image position, . . . , the Pi-th image position, . . . the P200-th image position. It is assumed that when the first eye and the second eye are in an i-th image block, values of k are adjusted until one tester can watch an image that is not distorted. Values of the correction parameter k, when the first eye is at each of the first image position, the second image position, . . . , the i-th image position, . . . the 200-th image position while the second eye is at each of the corresponding P1-th image position, the P2-th image position, . . . , the Pi-th image position, . . . the P200-th image position, can be obtained through calculation according to the above way, i.e., obtaining $k_1$, $k_2$, . . . , $k_{200}$. Based on the least-square method, by using the above 200 coordinates of the first eyes and the above 200 values of k, the first function relationship between the coordinates and k may be fitted as $k_l = f(u_l, v_l)$. Based on the least-square method, by using the above 200 coordinates of the second eyes and the above 200 values of k, the second function relationship between the coordinates and k may be fitted as $k_r = f(u_r, v_r)$.

It should be noted that, any way in the related art that can obtain function relationships for each first eye preset position, each second eye preset position, each initial first image correction parameter and each initial second image correction parameter may be applied in one embodiment of the present disclosure, and will not be elaborated herein.

After the function relationships for each first eye preset position, each second eye preset position, each initial first image correction parameter and each initial second image correction parameter have been obtained in the above way, the first image correction parameter is obtained through calculation based on the function relationship and the first eye position information, and the second image correction parameter is obtained through calculation based on the function relationship and the second eye position information.

It should be noted that, the above example is merely an algorithm for calculating image correction parameters, which is enumerated for better understanding of the technical solutions of the embodiments of the present disclosure, and any algorithm for calculating image correction parameters in the related art may be applied in one embodiment of the present disclosure, and will not be elaborated herein.

After the first image correction parameter and the second image correction parameter are obtained through calculation, the step 104 is performed.

At the step 104, the first image is corrected according to the first image correction parameter, and the second image is corrected according to the second image correction parameter.

In one embodiment of the present disclosure, the first image and the second image may be head up display (HUD) images. The HUD is a flight aid instrument, which is a flight aid instrument commonly used in aircrafts today, and may also be applied to some cars.

When the first image is a left eye image of the user (i.e., driver or pilot), the second image is a right eye image of the user; while the first image is a right eye image of the user (i.e., driver or pilot), the second image is a left eye image of the user, which are not specifically limited.

After the first image correction parameter and the second image correction parameter are obtained, the first image is corrected according to the first image correction parameter, and the second image is corrected according to the second image correction parameter. This enables the user to watch in real time corrected 3D images during driving, thereby improving the user's viewing experience.

Optionally, the above step 104 may include a sub-step K1 of using the following formula (1) to correct the first image and the second image, respectively, $$\begin{cases} x' = \dfrac{x}{1+ky} \cdot (1+ky_{max}) \\ y' = y \end{cases} \quad (1)$$

In one embodiment of the present disclosure, the first image and the second image may be corrected according to the above formula (1), respectively. In the above formula (1), x is a row coordinate of the first image or the second image; y is a column coordinate of the first image or the second image; x' is a row coordinate of the corrected first image or the corrected second image; y' is a column coordinate of the corrected first image or the corrected second image; $y_{max}$ represents a height of the first image or the second image; and k is a correction parameter.

After the first image correction parameter and the second image correction parameter are obtained according to the function relationships, the position of the first eye and the position of the second eye, by setting the first correction parameter $k_1$ and the second correction parameter $k_2$ while setting the row coordinate of the first image before being corrected, the column coordinate of the first image before being corrected and the height of the first image as $x_1$, $y_1$ and $y_{1max}$, respectively, $x_1$, $y_1$ and $y_{1max}$ and $k_1$ are substituted into the above formula (1), then the row coordinate x' and the column coordinate y' of the corrected first image can be obtained through calculation, thereby obtaining the corrected first image. Then, setting the row coordinate of the second image before being corrected, the column coordinate of the second image before being corrected and the height of the second image as $x_2$, $y_2$ and $y_{2max}$, respectively, $x_2$, $y_2$ and $y_{2max}$ and $k_2$ are substituted into the above formula (1), then the row coordinate x'$_2$ and the column coordinate y'$_2$ of the corrected second image can be obtained through calculation, thereby obtaining the corrected second image.

It should be noted that, using the above formula (1) to correct the first image and the second image is merely an optional solution of one embodiment of the present disclosure, and is not intended to limit the present disclosure.

By collecting the face image of the user, obtaining the first eye position information and the second eye position information of the user through calculation according to the face image, obtaining the first image correction parameter and the second image correction parameter though calculation based on the first eye position information and the second eye position information according to a preset algorithm, and then correcting the first image according to the first image correction parameter and correcting the second image according to the second image correction parameter, the image correction method of one embodiment of the present disclosure can solve the problems in the relater art that there are different distortions in vehicle-mounted HUD images due to different positions of the driver, thereby improving the user's viewing experience.

Figure 3:
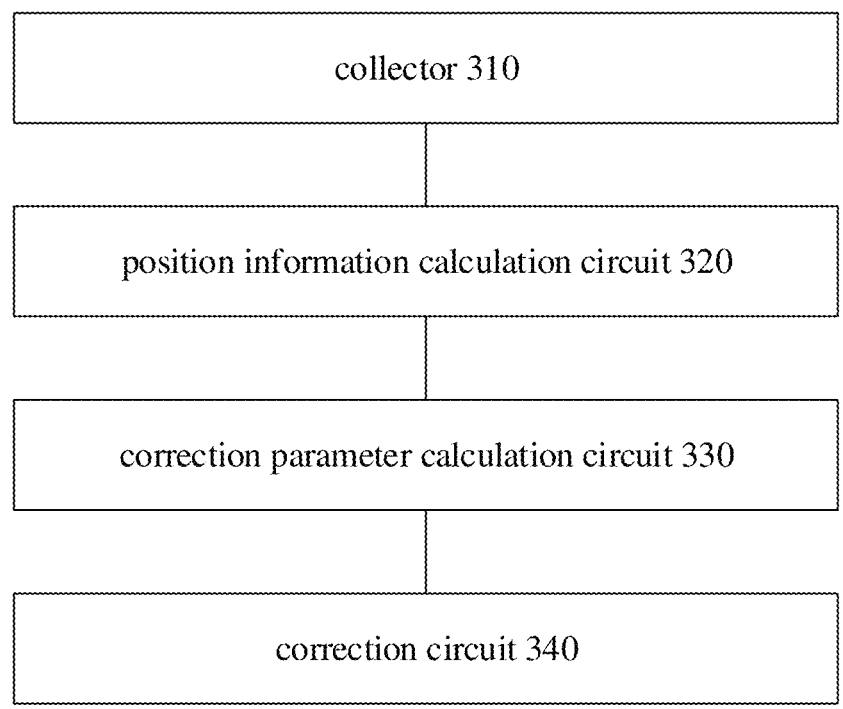
FIG. 3 is a schematic diagram of an image correction device according to an embodiment of the present disclosure.

FIG. 3 is a schematic diagram of an image correction device according to an embodiment of the present disclosure. As shown in FIG. 3, the image correction device includes a collector 310, a position information calculation circuit 320, a correction parameter calculation circuit 330 and a correction circuit 340.

The collector 310 is configured to collect a face image of a user. In one embodiment, the collector 310 may be implemented as a camera. The position information calculation circuit 320 is configured to obtain first eye position information and second eye position information of the user through calculation according to the face image. The correction parameter calculation circuit 330 is configured to, based on the first eye position information and the second eye position information, obtain a first image correction parameter and a second image correction parameter via calculation according to a preset algorithm. The correction circuit 340 is configured to correct the first image according to the first image correction parameter and correct the second image according to the second image correction parameter. In one embodiment, the position information calculation circuit 320, the correction parameter calculation circuit 330 and the correction circuit 340 may be implemented as a processor provided separately or a computing device such as a processor in the head up display device.

Optionally, the position information calculation circuit 320 includes: an eye detection sub-circuit configured to detect the first eye and the second eye from the face image according to an eye detection algorithm; an eye position information calculation sub-circuit configured to track in real time positions of the first eye and the second eye according to a tracking algorithm, and obtain the first eye position information and the second eye position information through calculation.

Optionally, the correction parameter calculation circuit 330 includes: a preset position setting sub-circuit configured to set in advance a threshold quantity of first eye preset positions and a threshold quantity of second eye preset positions; an initial image correction parameter obtaining sub-circuit configured to obtain each initial first image correction parameter at each first eye preset position for the first eye and obtain each initial second image correction parameter at each second eye preset position for the second eye; a function relationship determining sub-circuit configured to determine a first function relationship between each first eye preset position and each initial first image correction parameter and determine a second function relationship between each second eye preset position and each initial second image correction parameter; and an image correction parameter calculation sub-circuit configured to obtain the first image correction parameter through calculation based on the first function relationship and the first eye position information and obtain the second image correction parameter through calculation based on the second function relationship and the second eye position information.

Optionally, the first function relationship may be expressed as: $k_l=f(u_l,v_l)$ (2); and the second function relationship may be expressed as: $k_r=f(u_r,v_r)$ (3), where $k_l$ is the initial first image correction parameter, $k_r$ is the initial second image correction parameter, $(u_l, v_l)$ is the first eye preset position, and $(u_r,v_r)$ is the second eye preset position.

Optionally, the correction circuit 340 includes a correction sub-circuit configured to use the following formula (1) to correct the first image and the second image, respectively, $$\begin{cases} x' = \dfrac{x}{1+ky} \cdot (1+ky_{max}) \\ y' = y \end{cases} \quad (1)$$

Where x is a row coordinate of the first image or the second image; y is a column coordinate of the first image or the second image; x' is a row coordinate of the corrected first image or the corrected second image; y' is a column coordinate of the corrected first image or the corrected second image; $y_{max}$ represents a height of the first image or the second image; and k is a correction parameter.

Optionally, the first image and the second image may be head up display (HUD) images.

Optionally, the collector 310 is further configured to collect the face image of the user once every preset quantity of frames.

By collecting the face image of the user, obtaining the first eye position information and the second eye position information of the user through calculation according to the face image, obtaining the first image correction parameter and the second image correction parameter though calculation based on the first eye position information and the second eye position information according to a preset algorithm, and then correcting the first image according to the first image correction parameter and correcting the second image according to the second image correction parameter, the image correction device of one embodiment of the present disclosure can solve in real time the problems in the relater art that there are different distortions in vehicle-mounted HUD images due to different positions of the driver, thereby improving the user's viewing experience.

For each embodiment of the aforementioned method, for ease of description, it is described as a series combination of actions, those skilled in the art should understand that the present disclosure is not limited by the described operation sequence, since some of the steps may be performed in other sequences or simultaneously according to the present disclosure. Further, those skilled in the art should also understand that the embodiments are described in the present disclosure are exemplary embodiments, actions and modules involved are not necessarily required by the present disclosure.

The various embodiments in the present disclosure are described in a progressive manner, and each embodiment focuses on differences from other embodiments, and the same similar parts between the various embodiments may be referred to each other.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the above description of the present disclosure, reference to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. An image correction method comprising:
   collecting a target face image;
   obtaining first eye position information and second eye position information through calculation according to the face image;
   obtaining a first image correction parameter and a second image correction parameter via calculation based on the first eye position information and the second eye position information; and
   correcting a first image according to the first image correction parameter and correcting a second image according to the second image correction parameter;
   wherein correcting the first image according to the first image correction parameter and correcting the second image according to the second image correction parameter comprises:
   correcting the first image and the second image according to the following formula, respectively, $$\begin{cases} x' = \dfrac{x}{1+ky} \cdot (1+ky_{max}) \\ y' = y \end{cases}$$

where x is a row coordinate of the first image or the second image; y is a column coordinate of the first image or the second image; x' is a row coordinate of a corrected first image or a corrected second image; y' is a column coordinate of the corrected first image or the corrected second image; $y_{max}$ is a height of the first image or the second image; and k is a correction parameter.

2. The method of claim 1, wherein obtaining the first eye position information and the second eye position information through calculation according to the face image comprises:
   detecting a first eye and a second eye from the face image according to an eye detection algorithm; and
   tracking in real time positions of the first eye and the second eye according to a tracking algorithm, and obtaining the first eye position information and the second eye position information through calculation.

3. The method of claim 1, wherein obtaining the first image correction parameter and the second image correction parameter via calculation based on the first eye position information and the second eye position information, comprises:
   setting a threshold quantity of first eye preset positions and a threshold quantity of second eye preset positions;
   obtaining each initial first image correction parameter at each first eye preset position for the first eye, and obtaining each initial second image correction parameter at each second eye preset position for the second eye;
   determining a first function relationship between each first eye preset position and each initial first image correction parameter, and determining a second function relationship between each second eye preset position and each initial second image correction parameter; and
   obtaining the first image correction parameter through calculation based on the first function relationship and the first eye position information, and obtaining the second image correction parameter through calculation based on the second function relationship and the second eye position information.

4. The method of claim 3, wherein the first function relationship is expressed as:
   $k_l = f(u_l, v_l)$; and the second function relationship is expressed as: $k_r = f(u_r, v_r)$;
   wherein $k_l$ is the initial first image correction parameter, $k_r$ is the initial second image correction parameter, $(u_l, v_l)$ is the first eye preset position, and $(u_r, v_r)$ is the second eye preset position.

5. The method of claim 1, wherein the first image and the second image are head up display images.

6. The method of claim 1, wherein collecting the target face image comprises:
   collecting the target face image once per each first quantity of frames.

7. An image correction device comprising:
   a collector configured to collect a target face image;
   a position information calculation circuit configured to obtain first eye position information and second eye position information through calculation according to the face image;
   a correction parameter calculation circuit configured to, based on the first eye position information and the second eye position information, obtain a first image correction parameter and a second image correction parameter via calculation; and
   a correction circuit configured to correct a first image according to the first image correction parameter and correct a second image according to the second image correction parameter;
   wherein the correction circuit comprises a correction sub-circuit configured to use the following formula to correct the first image and the second image, respectively, $$\begin{cases} x' = \dfrac{x}{1+ky} \cdot (1+ky_{max}) \\ y' = y \end{cases} ;$$

where x is a row coordinate of the first image or the second image; y is a column coordinate of the first image or the second image; x' is a row coordinate of a corrected first image or a corrected second image; y' is a column coordinate of the corrected first image or the corrected second image; $y_{max}$ is a height of the first image or the second image; and k is a correction parameter.

8. The device of claim 7, wherein the position information calculation circuit comprises:
   an eye detection sub-circuit configured to detect the first eye and the second eye from the face image according to an eye detection algorithm; and
   an eye position information calculation sub-circuit configured to track in real time positions of the first eye and the second eye according to a tracking algorithm, and obtain the first eye position information and the second eye position information through calculation.

9. The device of claim 7, wherein the correction parameter calculation circuit comprises:
   a preset position setting sub-circuit configured to set a threshold quantity of first eye preset positions and a threshold quantity of second eye preset positions;
   an initial image correction parameter obtaining sub-circuit configured to obtain each initial first image correction parameter at each first eye preset position for the first eye, and to obtain each initial second image correction parameter at each second eye preset position for the second eye;
   a function relationship determining sub-circuit configured to determine a first function relationship between each first eye preset position and each initial first image correction parameter, and to determine a second function relationship between each second eye preset position and each initial second image correction parameter; and
   an image correction parameter calculation sub-circuit configured to obtain the first image correction parameter through calculation based on the first function relationship and the first eye position information, and to obtain the second image correction parameter through calculation based on the second function relationship and the second eye position information.

10. The device of claim 9, wherein the first function relationship is expressed as:
    $k_l = f(u_l, v_l)$ ; and the second function relationship is expressed as: $k_r = f(u_r, v_r)$ ;
    wherein $k_l$ is the initial first image correction parameter, $k_r$ is the initial second image correction parameter, $(u_l, v_l)$ is the first eye preset position, and $(u_r, v_r)$ is the second eye preset position; and
    wherein the image correction parameter calculation sub-circuit is further configured to obtain the first image correction parameter through calculation based on the first function relationship $k_l = f(u_l, v_l)$ the firsteye position information, and to obtain the second image correction parameter through calculation based on the second function relationship $k_r = f(u_r, v_r)$ and the second eye position information.

11. The device of claim 7, wherein the first image and the second image are head up display images.

12. The device of claim 7, wherein the collector is further configured to collect the target face image once per each first quantity of frames.

* * * * *